United States Patent [19]

Cho

[11] Patent Number: 5,783,338
[45] Date of Patent: Jul. 21, 1998

[54] METHOD FOR MANUFACTURING BLACK MATRIX OF ACTIVE MATRIX LIQUID CRYSTAL DISPLAY

[75] Inventor: Kyu-Chul Cho, Anyang, Rep. of Korea

[73] Assignee: LC Electronics Inc., Seoul, Rep. of Korea

[21] Appl. No.: 751,488

[22] Filed: Nov. 18, 1996

[30] Foreign Application Priority Data

Feb. 9, 1996 [KR] Rep. of Korea ............... 1996/3155

[51] Int. Cl.⁶ .................... G02B 5/20; G02F 1/1335
[52] U.S. Cl. .................... 430/7; 430/321; 349/110
[58] Field of Search .................... 430/7, 321; 349/110

[56] References Cited

U.S. PATENT DOCUMENTS 5,495,354  2/1996  Jo ........................................ 349/67

FOREIGN PATENT DOCUMENTS 4-242704  8/1992  Japan.
5-241014  9/1993  Japan.
6-324207  11/1994  Japan.
6-331818  12/1994  Japan.
7-064111  3/1995  Japan.

Primary Examiner—John A. McPherson
Attorney, Agent, or Firm—Morgan, Lewis & Bockius LLP

[57] ABSTRACT

A method for manufacturing a light shielding layer for a liquid crystal display device having a substrate includes the steps of forming a color filter layer including RGB colors on the substrate and coating a first light shielding material on the color filter layer and the substrate. A first back exposure is performed to form first hardened portions and first unhardened portions of the first light shielding material, and the unhardened portions are developed. A second light shielding material on the color filter layer and the first light shielding material. A second back exposure is performed to form second hardened and second unhardened portions of the second light shielding material, and the second unhardened portions are developed.

19 Claims, 7 Drawing Sheets

METHOD FOR MANUFACTURING BLACK MATRIX OF ACTIVE MATRIX LIQUID CRYSTAL DISPLAY

BACKGROUND OF THE INVENTION

1. Field of the Invention

The present invention relates to a method for manufacturing an active matrix liquid crystal display (hereinafter "AMLCD"), and more particularly, to a method for manufacturing a black matrix of an AMLCD.

2. Discussion of the Related Art

A structure of a liquid crystal display that is widely used is described below with reference to FIGS. 1 and 2. Two transparent substrates 12 and 22 for a liquid crystal display are joined with a fixed space, and then liquid crystal 70 is injected between them. On a first substrate 12, a color filter layer 4 is formed that displays a color tone of each pixel on the display screen. Common electrodes 11 at one side for supplying voltage to drive the liquid crystal are arrayed in a matrix along the pixels. On a second substrate 22, pixel electrodes 50 at the other side for supplying voltage to drive the pixels of the liquid crystal are arrayed corresponding to the common electrodes 11 on the first substrate 12. Thin film transistors 40 (hereinafter "TFT"), as switching elements, are connected to pixel electrodes 50 for driving them. The optical anisotropy of the liquid crystal at each pixel is controlled by turning the TFT 40 on or off to either transmit or cut off light.

FIG. 1 is a three-dimensional drawing showing the basic structure of a conventional AMLCD. FIG. 2 is a cross sectional drawing of FIG. 1 taken along I–I'. As shown in FIGS. 1 and 2, in the conventional AMLCD, a black matrix 7 (hereinafter "BM") is formed at the borders of each of R (red), G (green) and B (blue) colors of the color filter 4 on a first substrate 12. The BM 7 prevents the colors from being mixed by cutting off light at the border of the colors to maintain a high contrast. In some cases, the BM 7 can be formed on a second substrate 22 on which the TFTs are formed. In addition, a polarizing plate 10 is formed on each of the substrates 12 and 22, and an address bus line 20 and a data bus line 30 are formed on the second transparent substrate 22.

The method for manufacturing the first substrate 12 of the conventional liquid crystal display including a color filter layer 4 is described below. First, a transparent electrode, such as an ITO layer, is deposited on a transparent glass substrate 12 and patterned to a common electrode 11. A thin color filter layer 4, called RGB coat, is formed thereon. There are many methods for forming the RGB coat. Among them, the electrode deposition method is an appropriate one for forming the RGB coat precisely on the ITO pattern. The material for the RGB coat is capable of transmitting visible light and cutting off ultraviolet light. The material for the RGB is made of pigments that transmit visible light and display colors. A material having the characteristic of shielding light is also mixed in order to cut off ultraviolet light (hereinafter "UV light"). The amount of light shielding material to be mixed is such that the ability to shield UV light, which is used for hardening the photo resist in the next step of photo-lithography process, is up to 70%. The pigments that can satisfy these conditions are red pigment of bengal type, azo type, green pigment of phalocyanine type, and blue pigment of phalocyanine type. The RGB coat has to be hard enough so as not to be damaged by the next step in the process which is photo-lithography.

A second coat of a material having a type of resin as its main ingredient is laminated onto the ITO film and the RGB coat (which are formed at the first step with black resin). The second coat has an optical resistance against ultraviolet light, a light shielding ability, and an adhesive property. The second coat is laminated using such methods as spin coating, roll coating, spray coating, and offset printing for uniformity of the thin film. The main ingredient of the material of the second coat is a kind of resin, such as a type of acrylic, urethane, epoxy, synthetic rubber, polyvinyl-alcohol, etc., or a combination of them.

Exposure is carried out by using ultraviolet light from the rear side of the transparent substrate. This method of exposure is called back light exposure or back exposure. Ultra-high-pressure mercury lamp or metal high-light lamp is used as a source of light. In the case of back light exposure by using ultraviolet light, the optical resistance does not occur at the black resin on the RGB coat because the RGB coat has the light shielding ability against UV light. On the other hand, the black resin, which is also at an area not covered by the RGB coat, becomes insoluble due to a cross-linked reaction that progresses when it is exposed to UV light.

The black resin, which is not hardened on the RGB coat, is removed by a developing process. In doing so, the color filter layer including the RGB coat and the hardened black resin at the border line of the pigments is formed. The hardened black resin is formed into the BM.

However, in the conventional method mentioned above, a desirable thickness of the BM is not attainable because the negative black resin, which is commonly used for the second coat, may not be exposed to the light or may not be exposed to enough light during back light exposure. Due to this shortcoming, the quality of the contrast deteriorates since the light cannot be shielded perfectly. Additionally, due to an inadequate thickness of the BM, current leakage becomes a problem and the resulting malfunction is carried over to the liquid crystal display when external light enters into the layer of the TFT.

SUMMARY OF THE INVENTION

Accordingly, the present invention is directed to a method for manufacturing a black matrix of an active matrix liquid crystal display that substantially obviates one or more of the problems due to limitations and disadvantages of the related art.

A feature of the present invention is to provide an AMLCD that attains adequate black matrix.

Another feature of the present invention is to provide a black matrix of an AMLCD that adequately shields light to prevent leakage currents.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for manufacturing a light shielding layer for a liquid crystal display device having a substrate includes the steps of forming a color filter layer including RGB colors on the substrate; coating a first light shielding material on the color filter layer and the substrate; performing a first back exposure to form first hardened portions and first unhardened portions of the first light shielding material; developing the unhardened portions; coating a second light shielding material on the color filter layer and the first light shielding material; performing a second back exposure to form second hardened and second unhardened portions of the second light shielding material; and developing the second unhardened portions.

In another aspect, the present invention provides a method for manufacturing a light shielding layer for a liquid crystal display device having a thin film transistor and a pixel electrode on a substrate including the steps of forming the thin film transistor and pixel electrode on the substrate; coating a first light shielding material on the thin film transistor and the pixel electrode; removing the first light shielding material on a substantial portion of the pixel electrode; coating a second light shielding material on the first light shielding material over the thin film transistor; performing a back exposure to form a hardened portion and an unhardened portion of the second light shielding material; and developing the unhardened portion In a further aspect, the present invention provides a method for manufacturing a light shielding layer for a liquid crystal display device having a substrate including the steps of forming a transparent conductive layer on a substrate; patterning the transparent conductive layer; forming a color filter layer including RGB colors on the patterned transparent conductive layer; coating a first light shielding material on the color filter layer and the substrate; performing a first back exposure to form first hardened portions and first unhardened portions of the first light shielding material; developing the unhardened portions; coating a second light shielding material on the color filter layer and the first light shielding material; performing a second back exposure to form second hardened and second unhardened portions of the second light shielding material; and developing the second unhardened portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention provides a method of forming an AMLCD including the step of forming a pixel electrode substrate (a second substrate), on which pixel electrode, TFTs, and BM are formed. The present invention also includes a step of forming a color filter layer substrate (a first substrate), on which common electrode, color filter, and BM are formed. The BM formed by using such a method is strengthened and thick enough to adequately shield light and prevent leakage currents.

According to the present invention, the method for manufacturing the first substrate on which the color filter layer is formed includes the steps of depositing sequentially R, G and B on a transparent substrate by electrode deposition method; coating a first photo-sensitive black resin; developing the un-hardened part of the first black resin on the RGB coat by a first back exposure by using ultraviolet light; coating a second photo-sensitive black resin; developing the un-hardened part of the second black resin on the RGB coat by a second back exposure.

According to the present invention, the method for manufacturing the second substrate on which the pixel electrode is formed includes the steps of patterning a first black resin on a glass substrate excluding the pixel electrode area; coating the photo-sensitive black resin thereon; back exposing the photo-sensitive black resin by UV light using the first black resin as a mask; developing the un-hardened part of the photo-sensitive black resin on the pixel electrode.

Preferred Embodiment 1

Figure 1:
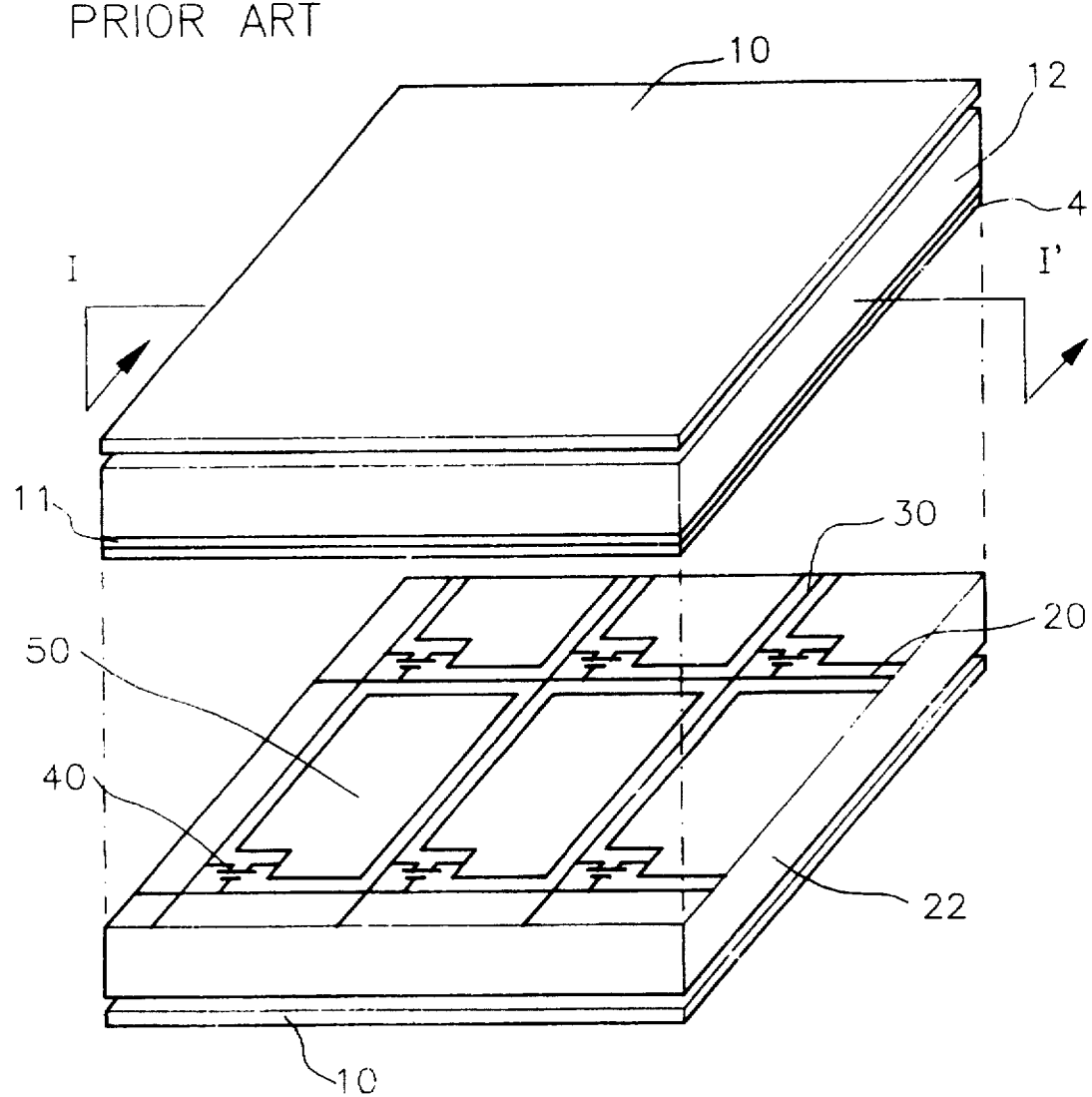
FIG. 1 illustrates a basic structure of an AMLCD.
Figure 2:
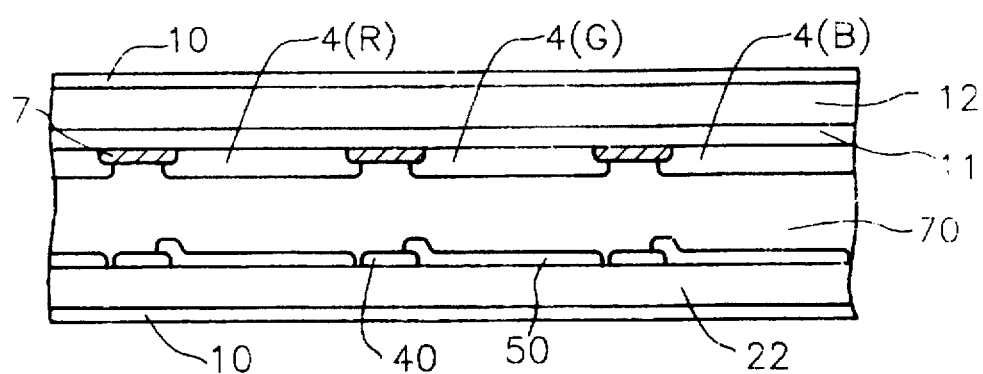
FIG. 2 is a cross-sectional view of FIG. 1 taken along the line I-I'.
Figure 3A:
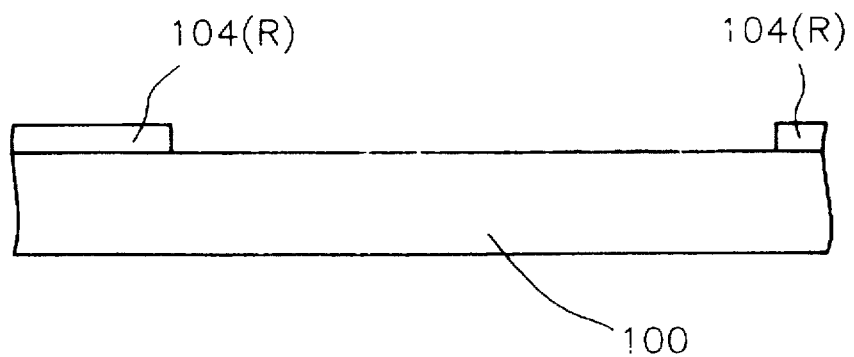
FIGS. 3A to 3F are sectional views showing the process for manufacturing a black matrix of a color filter side of an AMLCD in accordance with the present invention.
Figure 3B:
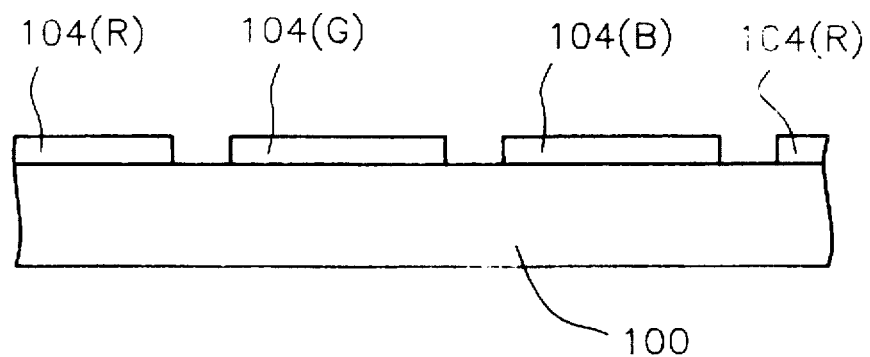

Referring now to FIGS. 3A–3F, which show the color filter side of the AMLCD, a red coat 104(R) is coated and patterned on a transparent glass substrate 100 (FIG. 3A). Thereafter, green 104(G) and blue 104(B) coats are coated and patterned sequentially (FIG. 3B). The RGB coat transmits visible light while shielding ultraviolet lights, which is used for the next step of photo-lithography.

Figure 3C:
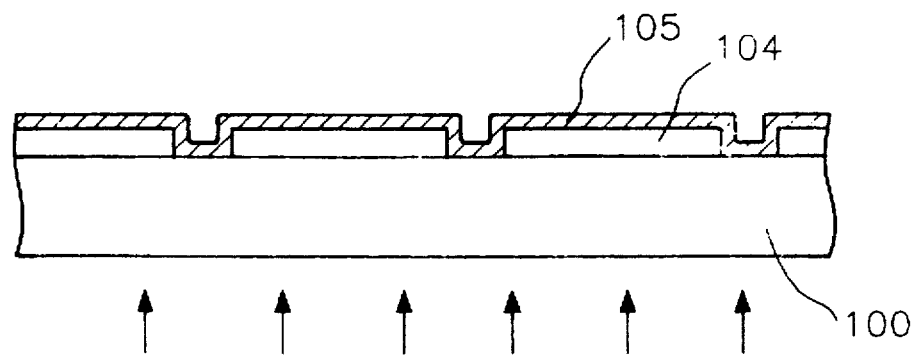
Figure 3D:
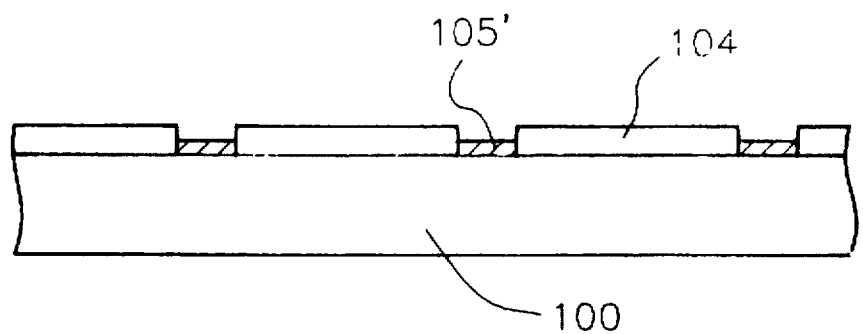

A negative photo-sensitive black resin 105 having properties of optical resistance and light shielding is coated on the transparent substrate 100 and the color layer 104, as shown in FIG. 3C. A first back exposure is carried out by using the RGB pattern as a mask, and the un-hardened black resin 105 which is on the RGB pattern is removed by using a developing solution. As a result thereof, a first BM layer 105' is formed, as shown in FIG. 3D.

Figure 3E:
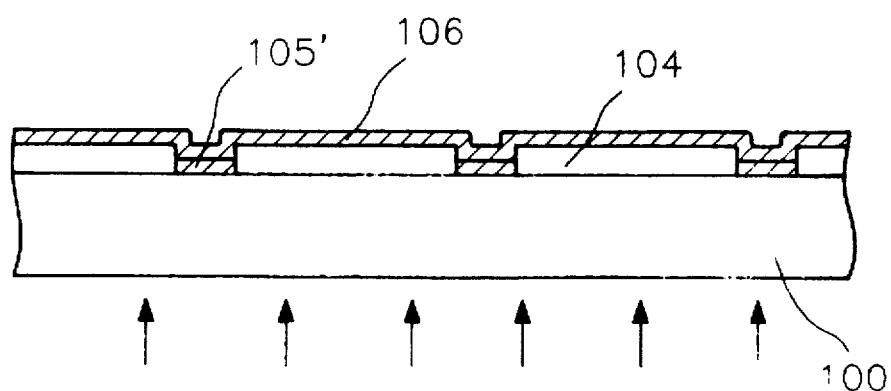
Figure 3F:
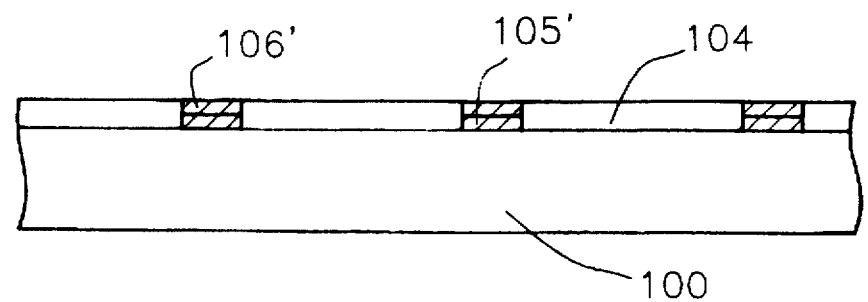

Next, a positive photo-sensitive black resin 106 is coated thereon (FIG. 3E). A second back exposure is carried out by using the first BM layer formed by the first back exposure step as a mask. The un-hardened part of the positive black resin 106 on the RGB pattern is removed by using a developing solution. As a result thereof, a second BM layer 106' is additionally formed on the first BM layer 105' (FIG. 3F). Accordingly, two black matrix layers are formed.

Preferred Embodiment 2

Figure 4A:
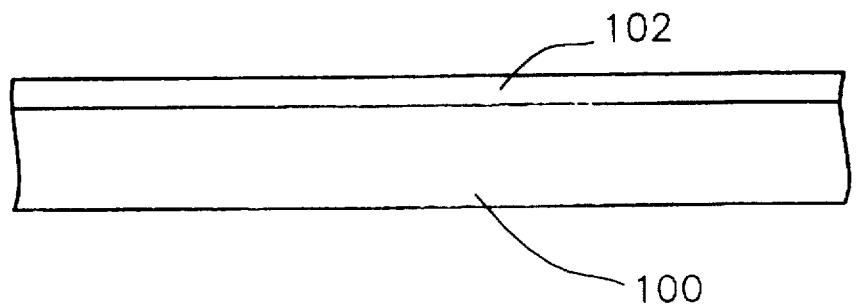
FIGS. 4A to 4H are sectional views showing another process for manufacturing a black matrix of a color filter side of an AMLCD in accordance with the present invention.
Figure 4B:
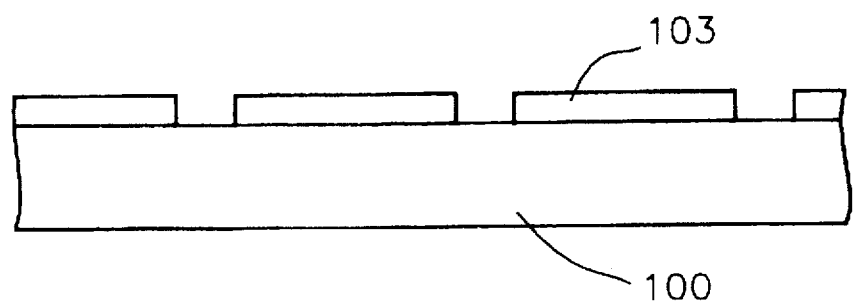
Figure 4C:
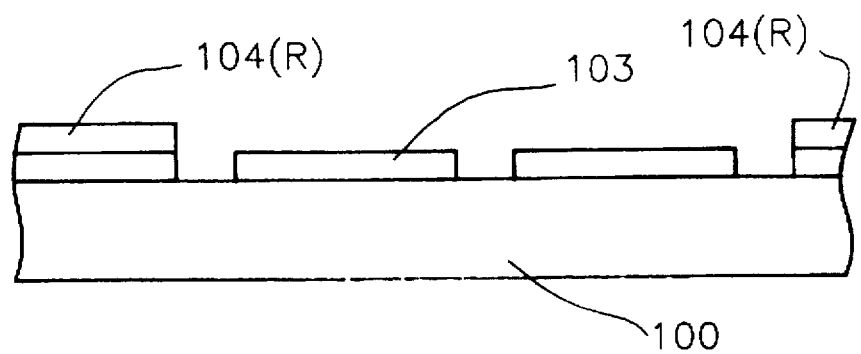
Figure 4D:
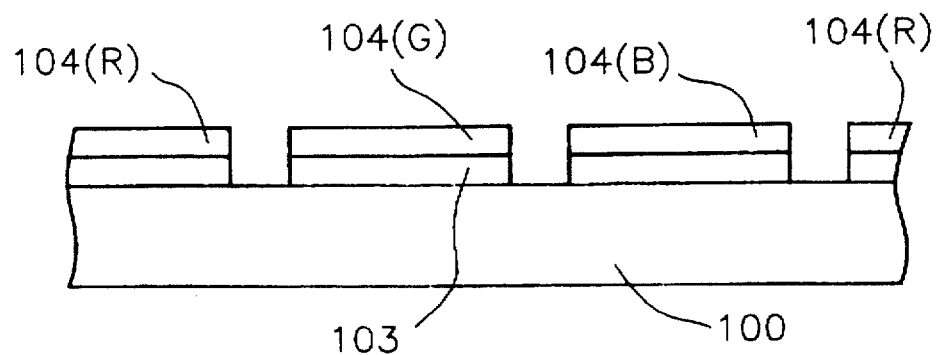

Referring now to FIGS. 4A–4H, which show the color filter side of the AMLCD using an electrode deposition method, a transparent electrode 102 for forming the common electrode 103 of the AMLCD is deposited on a transparent glass substrate 100 (FIG. 4A). The transparent electrode 102 is patterned to form a shape of the pixels by photo-lithography (FIG. 4B). A series of a red coat 104(R) is coated and patterned by an electrode deposition method on the common electrode 103 (FIG. 4C). Thereafter, green 104(G) and blue 104(B) coats are coated and patterned sequentially by using the electrode deposition method (FIG. 4D). The RGB coat transmits visible light while shielding ultraviolet lights, which is used for the next step of photo-lithography.

Figure 4E:
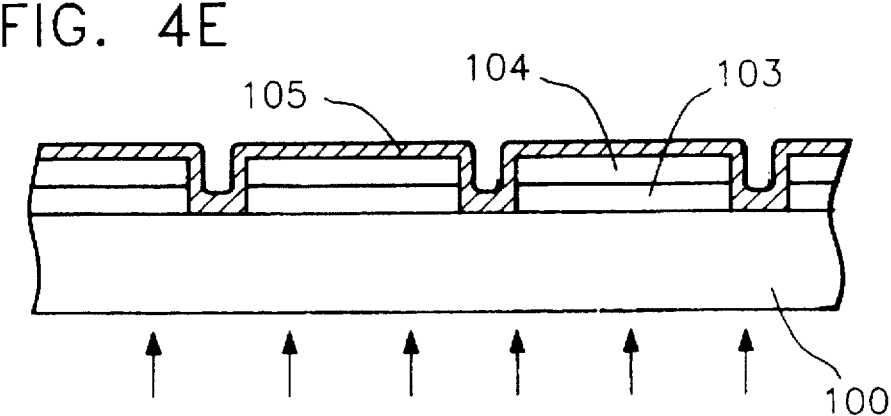
Figure 4F:
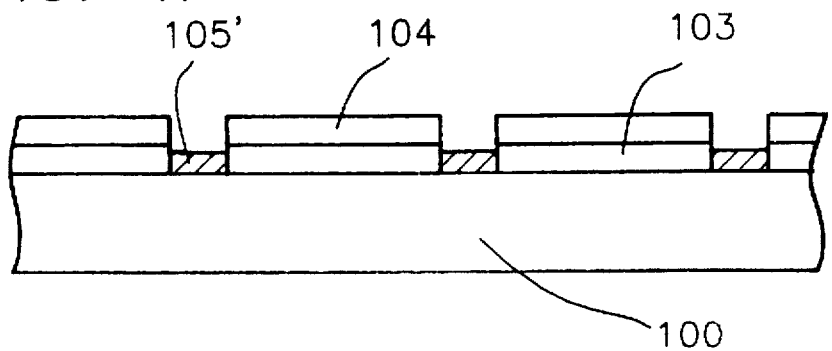

A negative photo-sensitive black resin 105 having properties of optical resistance and light shielding is coated on the transparent substrate 100 and the color layer 104, as shown in FIG. 4E. A first back exposure is carried out by using the RGB pattern as a mask, and the unhardened black resin 105, which is on the RGB pattern, is removed using a developing solution. As a result thereof, a first BM layer 105' is formed, as shown in FIG. 4F.

Figure 4G:
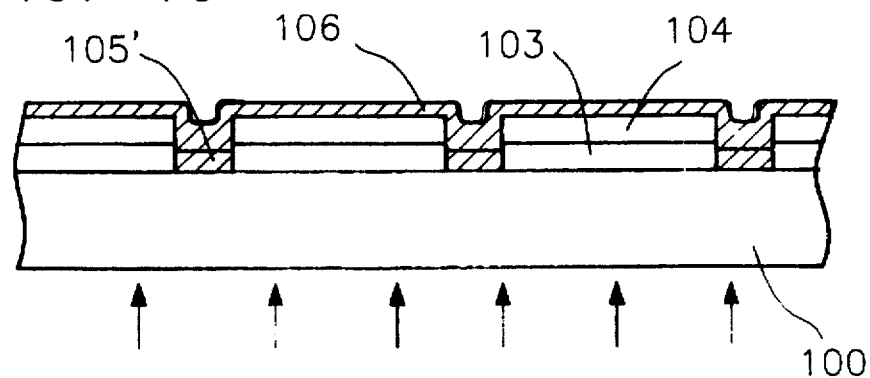
Figure 4H:
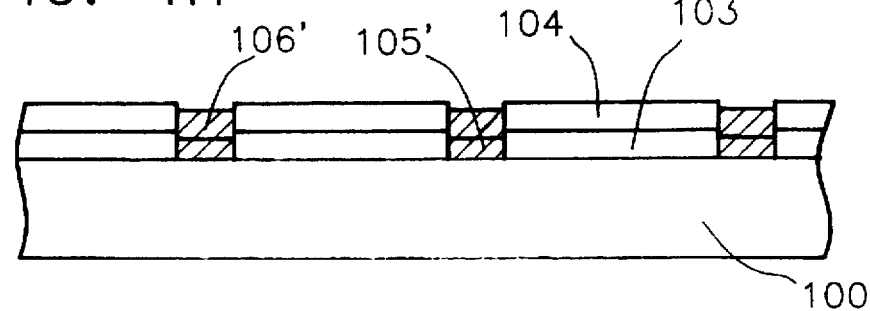

Next, a positive photo-sensitive black resin 106 is coated thereon (FIG. 4G). A second back exposure is carried out by using the first BM layer formed by the first back exposure step as a mask. The unhardened part of the positive black resin 106 on the RGB pattern is removed using a developing solution. As a result thereof, a second BM layer 106' is additionally formed on the first BM layer 105' (FIG. 4H). Accordingly, two black matrix layers are formed.

Preferred Embodiment 3

Figure 5A:
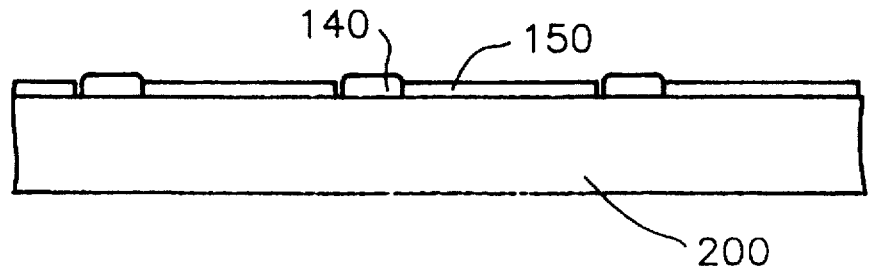
FIGS. 5A to 5E are sectional views showing the process for manufacturing a black matrix of a TFT side of an AMLCD in accordance with the present invention.
Figure 5B:
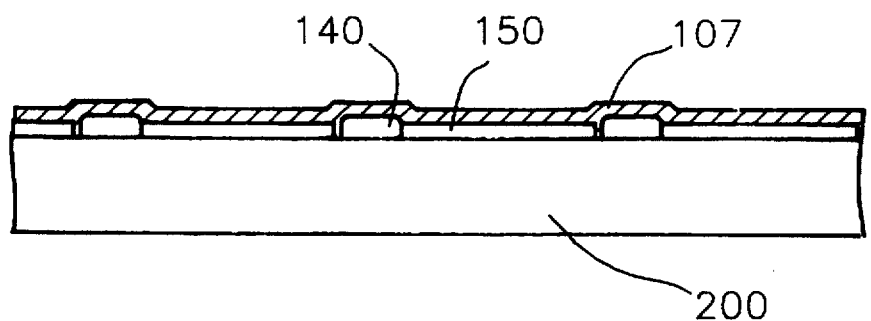
Figure 5C:
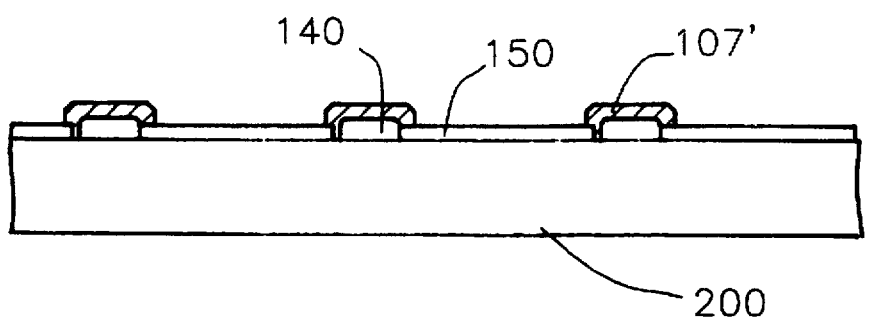
Figure 5D:
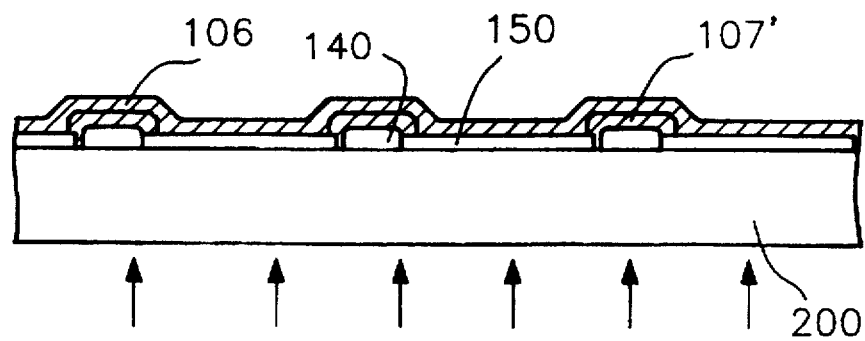
Figure 5E:
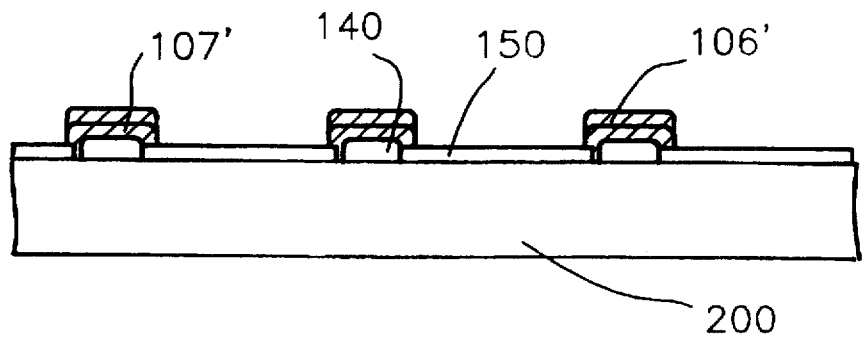

Another method for manufacturing a BM on a substrate is shown in FIGS. 5A–5E, which concerns the TFT side of the AMLCD in accordance with the present invention. Referring to FIGS. 5A–5E, TFTs 140 and pixel electrodes 150 are formed on a transparent glass substrate 200 (FIG. 5A). A first black resin layer 107 is formed on the TFTs 140 and pixel electrodes 150 over the substrate 200 (FIG. 5B). The first black resin 107 is patterned to cover the TFTs 140 and small portions of the pixel electrodes 150 adjacent the TFTs 140 (excluding most of the pixel electrode area) (see 107' in FIG. 5C). Then, a positive photo-sensitive black resin 106 is coated thereon (FIG. 5D). A back exposure is carried out by using the first black resin 107' as a mask to produce hardened and unhardened black resin portions. Unhardened black resin 106 on the pixel electrode 150 is removed by using a developing solution to form the second black resin 106' over the first black resin 107' (FIG. 5E). Accordingly, two BM layers are formed over the TFTs 140.

When the photo-sensitive black resin is formed into the BM layer by using photo-lithography, the present invention effectively shields light. Therefore, the contrast of an LCD manufactured by using the method of the present invention is greater than that of an LCD manufactured by using the conventional method. Moreover, the quality of the display is improved in the present invention.

It will be apparent to those skilled in the art that various modifications and variations can be made in the method for manufacturing a black matrix of an active matrix liquid crystal display of the present invention without departing from the spirit or scope of the invention. Thus, it is intended that the present invention cover the modifications and variations of this invention provided they come within the scope of the appended claims and their equivalents.

What is claimed is:

1. A method for manufacturing a light shielding layer for a liquid crystal display device having a substrate, the method comprising the steps of:

forming a color filter layer including RGB colors over the substrate;

coating a first light shielding material on the color filter layer and the substrate;

performing a first back exposure to form first hardened portions and first unhardened portions of the first light shielding material;

developing the unhardened portions;

coating a second light shielding material on the color filter layer and the first light shielding material;

performing a second back exposure to form second hardened and second unhardened portions of the second light shielding material; and developing the second unhardened portions.

2. The method according to claim 1, wherein the first light shielding material includes black resin.

3. The method according to claim 1, wherein the first light shielding material includes negative black resin.

4. The method according to claim 1, wherein the second light shielding material includes black resin.

5. The method according to claim 1, wherein the second light shielding material includes positive black resin.

6. The method according to claim 1, wherein the step of performing the first back light exposure uses ultraviolet light and uses the color filter layer as a mask.

7. The method according to claim 1, wherein the step of performing the second back light exposure uses ultraviolet light and uses the first hardened portions as a mask.

8. The method according to claim 1, further comprising the step of:

forming a transparent conductive layer on the substrate before forming the color filter layer;

patterning the transparent conductive layer; and wherein forming the color filter layer on the patterned transparent conductive layer.

9. The method according to claim 8, wherein the step of performing the first back light exposure uses ultraviolet light and uses the color filter layer as a mask.

10. The method according to claim 8, wherein the step of performing the second back light exposure uses ultraviolet light and uses the first hardened portions as a mask.

11. A method for manufacturing a light shielding layer for a liquid crystal display device having a thin film transistor and a pixel electrode on a substrate, the method comprising the steps of:

forming the thin film transistor and pixel electrode on the substrate;

coating a first light shielding material on the thin film transistor and the pixel electrode;

removing the first light shielding material on a substantial portion of the pixel electrode;

coating a second light shielding material on the first light shielding material over the thin film transistor;

performing a back exposure to form a hardened portion and an unhardened portion of the second light shielding material; and developing the unhardened portion.

12. The method according to claim 11, wherein the first light shielding material includes black resin.

13. The method according to claim 11, wherein the first light shielding material includes negative black resin.

14. The method according to claim 11, wherein the second light shielding material includes black resin.

15. The method according to claim 11, wherein the second light shielding material includes positive black resin.

16. The method according to claim 11, wherein the step of performing the back light exposure uses ultraviolet light and uses the first light shielding material as a mask.

17. A liquid crystal display device comprising:

a substrate;

a plurality of color filters on the substrate;

a plurality of first light shielding materials between the color filters, the first light shielding materials comprising a negative photo-sensitive black resin; and a plurality of second light shielding materials on the first light shielding materials, the second light shielding materials comprising a positive photo-sensitive black resin.

18. A liquid crystal display device comprising:

a substrate;

thin film transistors and pixel electrodes on the substrate;

a plurality of first light shielding materials on the TFTs; and a plurality of second light shielding materials on the first light shielding materials;

wherein the first light shielding materials comprising a negative photo-sensitive black resin.

19. A liquid crystal display device comprising:

a substrate;

thin film transistors and pixel electrodes on the substrate;

a plurality of first light shielding materials on the TFTs; and a plurality of second light shielding materials on the first light shielding materials;

wherein the second light shielding materials comprising a positive photo-sensitive black resin.

* * * * *